United States Patent
Yeh

(10) Patent No.: US 6,863,063 B2
(45) Date of Patent: Mar. 8, 2005

(54) BARBECUE GRILL WITH FOLDING LEGS

(76) Inventor: Jui-Ju Yeh, 14F, No. 223, Sec. 5, Nanking E. Rd., Taipei (TW)

( * ) Notice: Subject to any disclaimer, the term of this patent is extended or adjusted under 35 U.S.C. 154(b) by 0 days.

(21) Appl. No.: 10/391,015

(22) Filed: Mar. 19, 2003

(65) Prior Publication Data
US 2004/0182381 A1 Sep. 23, 2004

(51) Int. Cl.[7] .......................... A47J 37/00; F24C 15/08
(52) U.S. Cl. .................. 126/25 R; 126/276; 126/304 A
(58) Field of Search .......................... 126/25 R, 41 R, 126/9 R, 304 A, 305, 304 R; 108/116, 119, 132; 248/421, 432, 164, 172, 129, 439

(56) References Cited
U.S. PATENT DOCUMENTS 4,296,694 A * 10/1981 Kobayashi .................. 108/116
5,163,414 A * 11/1992 Haynes, Jr. ................ 126/25 R
5,417,168 A *  5/1995 Soper ......................... 108/124
6,439,221 B1 *  8/2002 Ward et al. ................ 126/25 R

* cited by examiner

Primary Examiner—James C. Yeung
(74) Attorney, Agent, or Firm—Troxell Law Office, PLLC

(57) ABSTRACT

A barbecue grill with folding legs has a barbecue body and a folding leg assembly pivotally attached to the barbecue body. The barbecue body has an adjustment and storage bracket on the bottom. The folding leg assembly has an adjustment leg and a pivoting leg, and each leg has telescopic feet to regulate the high of the barbecue in accordance with present invention. A latch ring is mounted on the adjustment leg to hook the adjustment and storage bracket and can make small adjustments in the height of the barbecue.

7 Claims, 5 Drawing Sheets

BARBECUE GRILL WITH FOLDING LEGS

BACKGROUND OF THE INVENTION

1. Field of Invention

The present invention relates to a barbecue grill, and more particularly to a barbecue grill that has folding legs.

2. Description of the Related Art

A conventional barbecue has a cooking pot to cook food, such as meat, potatoes, etc., over charcoal or the like. Supporting legs with wheels are mounted under the cooking pot. Food is cooked on a grill or a spit inside the cooking pot, and charcoal or the like is burned in the cooking pot under the grill or spit to barbecue the food. The supporting legs with wheels provide a convenient way of moving the barbecue grill. The supporting legs with wheels on the conventional barbecue grill are stationary and unable to be folded. The conventional supporting legs are straight, cross-linked, etc. However, the different types of supporting legs support the cooking pot at a fixed height and cannot be folded to decrease the volume of the barbecue grill. Consequently, the conventional barbecue grill cannot be adjusted to barbecue in a confined vertical space or conveniently on a table.

To overcome the shortcomings, barbecue grills with folding legs that can be used on a table or stored with a smaller volume are still needed to obviate or mitigate the aforementioned problems.

SUMMARY OF THE INVENTION

The primary objective of the present invention is to provide a barbecue grill with an adjustable height and volume. The barbecue grill in accordance with the present invention has a barbecue body and a folding leg assembly with means to completely fold the legs against the barbecue body for storage and to adjust the height of the barbecue body. The barbecue body has a bottom. The folding leg assembly comprises a pair of U-shaped legs pivotally connected to each other. One of the U-shaped legs is pivotally connected to the bottom of the barbecue body and the other U-shaped leg is selectively hooked to an adjustment rack on the bottom of the barbecue body. Therefore, the barbecue grill with folding legs can be collapsed simply and easily stored.

Other objectives, advantages and novel features of the invention will become more apparent from the following detailed description when taken in conjunction with the accompanying drawings.

DETAILED DESCRIPTION OF THE INVENTION

Figure 1:
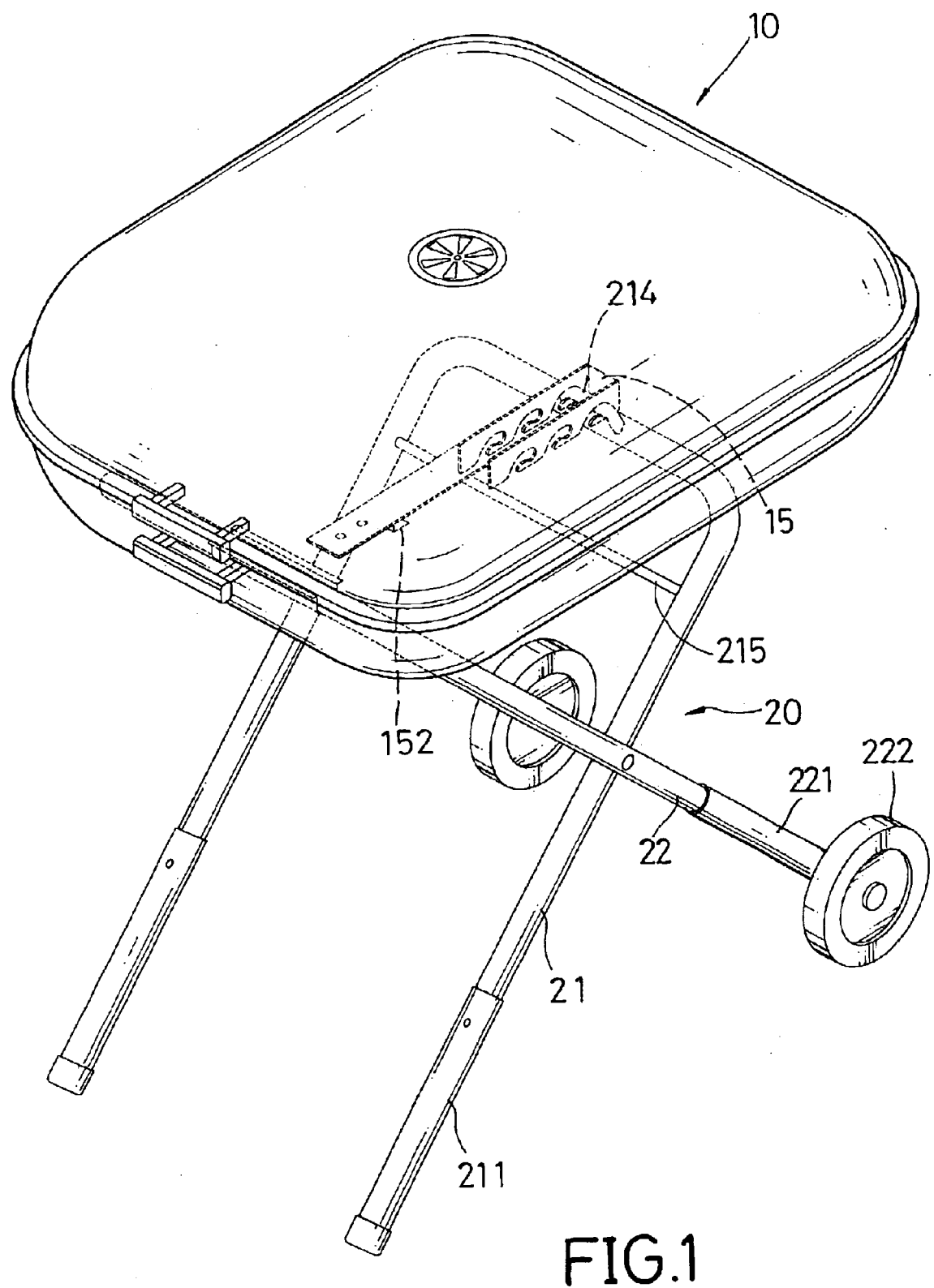
FIG. 1 is a perspective view of a barbecue grill with folding legs in accordance with the present invention.

With reference to FIG. 1, a barbecue grill with folding legs in accordance with present invention comprises a barbecue body (10) and a folding leg assembly (20).

The barbecue body (10) has a bottom (not numbered), an outside (not numbered), an inside (not numbered) and an adjustment and storage bracket (15). The inside of the barbecue body (10) is concave. The adjustment and storage bracket (15) is securely attached to the outside of the barbecue body (10) on the bottom and has two ends (not numbered), multiple adjustment hooks (151) and a storage notch (152). The multiple adjustment hooks (151) are formed sequentially from one end of the adjustment and storage bracket (15). The storage notch (152) is formed at the other end of the adjustment and storage bracket (15).

The folding leg assembly (20) has an adjustment leg (21) and a pivoting leg (22). The adjustment leg (21) is U-shaped and has a proximal end (not numbered), two parallel supports (not numbered), a second cross member (not numbered), a latch ring (214), two telescopic feet (211) and a transverse storage rod (215). Each support has a proximal end (not numbered), a distal end (not numbered), the second locking device (not numbered) and a telescopic foot (211). The proximal end of each support is integrally formed with the second cross member and extends down parallel to the other support. The transverse storage rod (215) is mounted between the supports near the proximal end of the supports to engage the storage notch (152) when the folding leg assembly (20) is folded.

Figure 2:
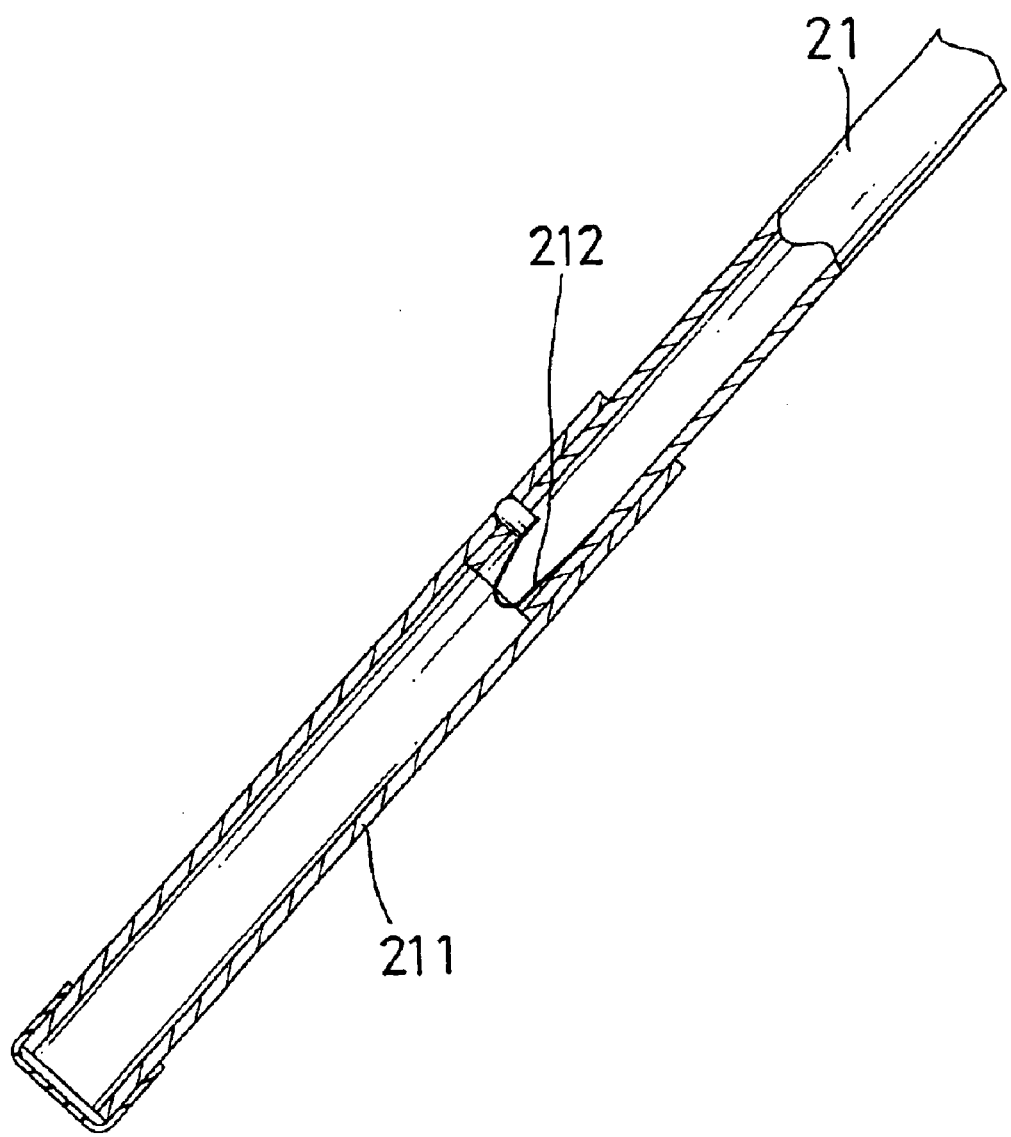
FIG. 2 is an enlarged side plan view in partial section of a distal end of an adjustable leg of the barbecue grill in FIG. 1.

With further reference to FIG. 2, a telescopic foot (211) is attached to and extends from the distal end of each support. Each telescopic foot (211) is a tube (not numbered) with an open end (not numbered), a closed end (not numbered) and an inside diameter (not numbered). The inside diameter is large enough so the open end of the telescopic foot (211) can slide over the distal end of the support. The distal end of each support is open, and a first locking device is mounted inside the distal end of each support. The first locking device comprises a U-shaped resilient piece (212), a button (not numbered) and two buttonholes (not numbered). The U-shaped resilient piece (212) has two ends (not numbered) and an outside (not numbered). The button is attached to the outside of the U-shaped resilient piece (212) near one end. A first buttonhole is formed in each support near the open end, and a second buttonhole is defined in each telescopic foot (211). The U-shaped resilient piece (212) is inserted into the open end of each support, and the button is inserted into and extends out of the corresponding buttonholes in the corresponding support and the telescopic foot (211) to hold telescopic foot (211) in place.

Figure 3:
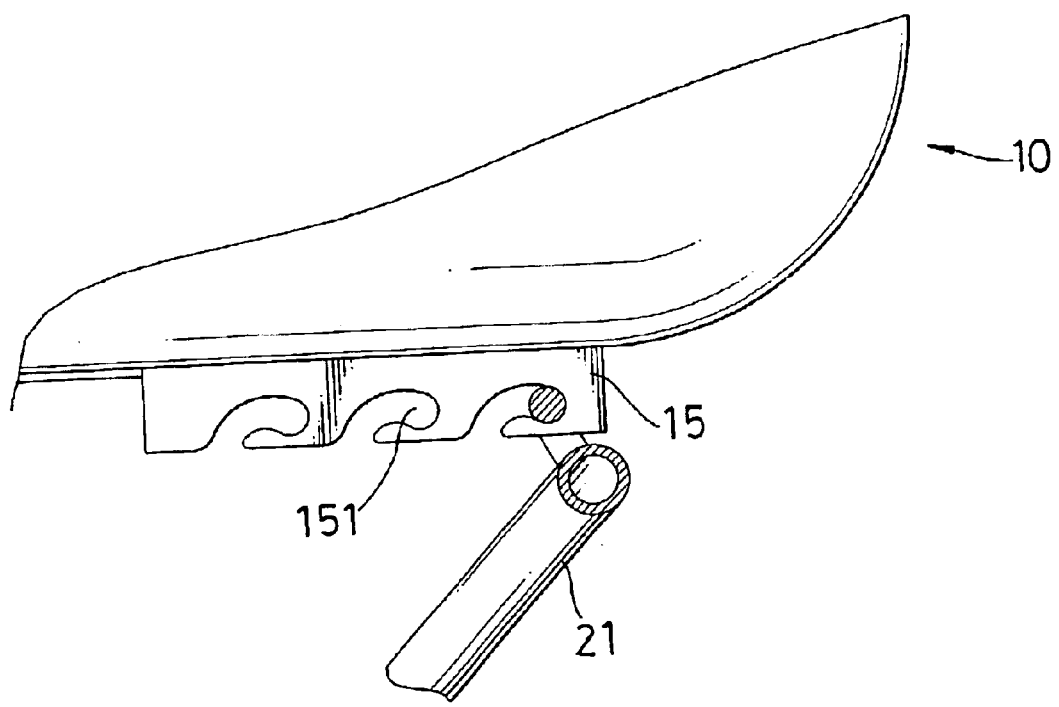
FIG. 3 is an enlarged side plan view in partial section of the bottom of the barbecue body in FIG. 1.

With further reference to FIG. 3, the latch ring (214) is attached to the second cross member to selectively engage one of the adjustment hooks (151) on the adjustment and storage bracket (15).

The pivoting leg (22) is also U-shaped and has a proximal end (not numbered), two distal end (not numbered), two parallel supports (not numbered), a first cross member (not numbered), a bracket (not numbered), two telescopic end tubes (221) and two wheels (222). The bracket is U-shaped and has an open end pivotally mounted around the first cross member and securely attached to the bottom of the barbecue body (10) in line with the adjustment and storage bracket (15). Each support has a proximal end (not numbered) and a distal end (not numbered). The proximal end of each support is integrally formed with the first cross member and extends down parallel to the other support. The first cross member of pivoting leg (22) is longer than the second cross member on the adjustment leg (21) so the adjustment leg (21) folds inside the pivoting leg (22) when the folding leg assembly (20) is folded. The pivoting leg (22) is pivotally attached to the adjustment leg (21) near midpoints of the supports of the pivoting leg (22) and the adjustment leg (21). A telescopic end tube (221) is mounted on the distal end of each support and is the same as the telescopic feet (211) on the adjustable leg (21) so is not further described. The wheels (222) are attached respectively to the telescopic end tubes (221) on the supports of the pivoting leg (22) near the closed end.

To extend the folding legs, the pivot leg (22) is pulled away from the bottom of the barbecue body (10) and the transverse storage rod (215) on the adjustable leg (21) is released from the storage notch (152). The second cross member of the adjustment leg (21) is moved along the barbecue body (10) until the adjustment leg (21) and the pivoting leg (22) form a cross. Then the latch ring (214) on the second cross member of the adjustment leg (21) is hooked selectively into one of the multiple adjustment hooks (151) on the adjustment and storage bracket (15). The telescopic feet (211) and the telescopic end tubes (221) can be extended or retracted to adjust the total length of folding leg assembly (20) and the height of the barbecue body (10).

Figure 4:
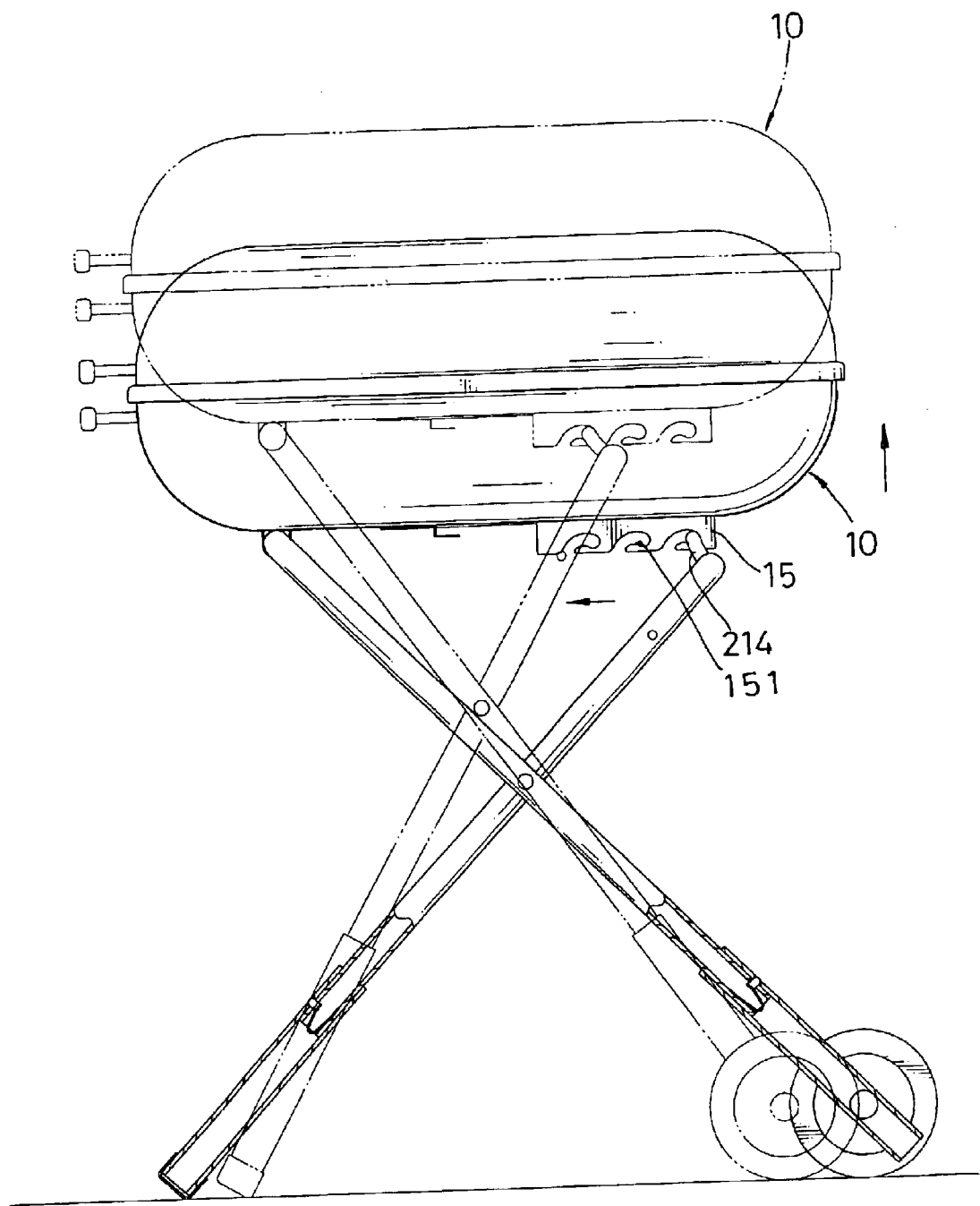
FIG. 4 is a operational side plan view of the barbecue grill with folding legs in FIG. 1.

With reference of FIG. 4, the height of the barbecue body (10) can be further adjusted by the selection of which multiple adjustment hooks (151) is connected to the latch ring (214). Selecting an adjustment hook (151) near an outer edge of the barbecue body (10) lowers the height of the barbecue body (10). The barbecue grill with folding legs as described can be adjusted to a person's body height.

Figure 5:
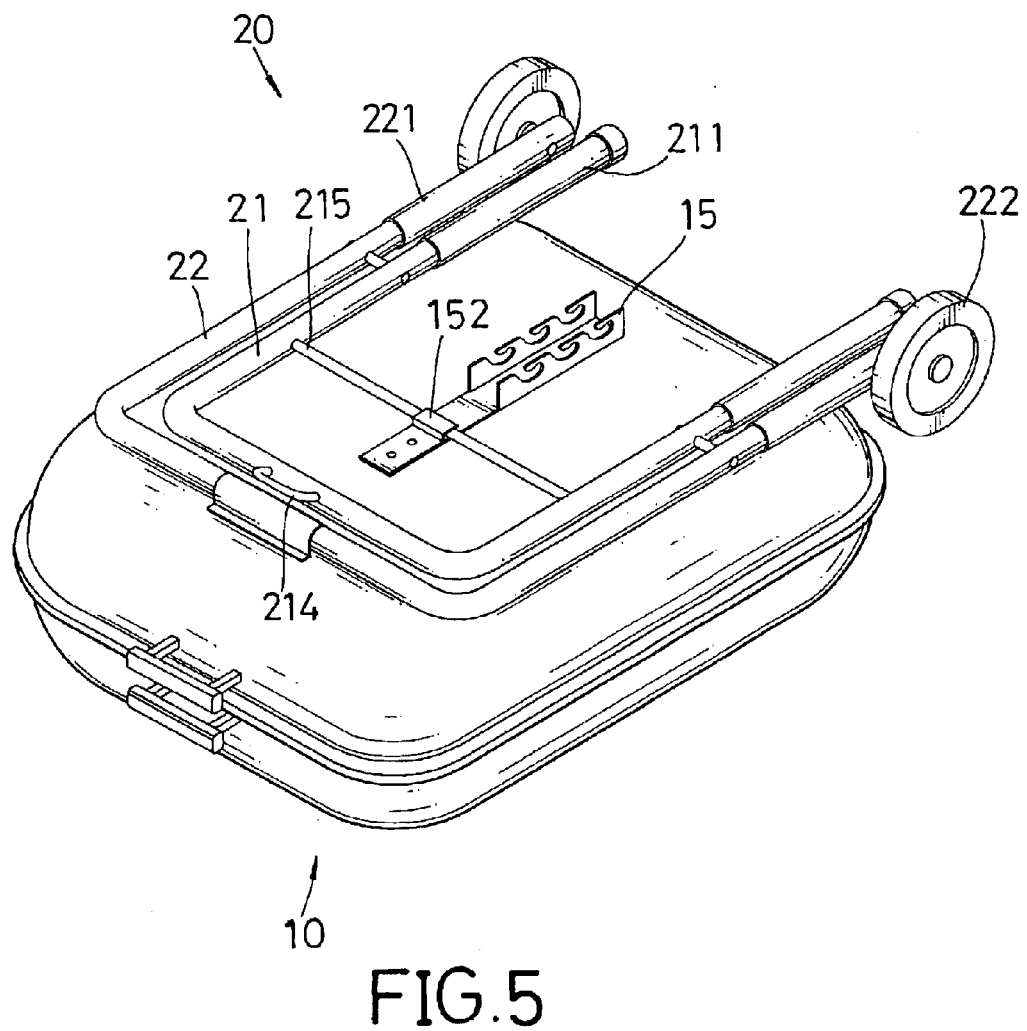
FIG. 5 is a perspective view of the barbecue grill in FIG. 1 with the legs folded.

With reference to FIG. 5, the latch ring (214) is released from the adjustment hooks (151) in the adjustment and storage bracket (15), and the adjustment leg (21) is pivoted so the cross members of the adjustment leg (21) and the pivoting leg (22) correspond to fold the legs (21, 22) under the bottom of the base (12). The transverse storage rod (215) on the adjustment leg (21) is hooked into the storage notch (152) to hold the legs (21, 22) in a stored position. The telescopic feet (211) and the telescopic end tubes (221) can be retracted by pressing the buttons and pushing the telescopic feet (211) and the telescopic end tubes (221) toward their respective supports. Because the folding leg assembly (20) of the barbecue grill can be folded, the barbecue grill with folding legs can be stored at a smaller space or used on a table.

The invention may be varied in many ways by a person skilled in the art. Such variations are not to be regarded as a departure from the spirit and scope of the invention, and all such modifications are intended to be included within the scope of the following claims.

What is claimed is:

1. A barbecue grill with folding legs comprising:
   a) a barbecue body having a bracket located on an exterior of a base thereof, the bracket having a plurality of adjustment hooks;
   b) a folding leg assembly moveable between raised and folded positions and having:
      i) an adjustment leg having a first U-shaped portion with two parallel first supports and a telescoping foot slidably connected to each of the two parallel first supports, each telescoping foot being movable between extended and retracted positions, each telescoping foot being selectively locked in the extended position by one of a plurality of locking devices connected to each of the two parallel first supports, the first U-shaped portion is removably inserted into one of the plurality of adjustment hooks to position the barbecue body at one of a plurality of predetermined heights; and
      ii) a pivoting leg having a second U-shaped portion with two parallel second supports and a telescoping end tube slidably connected at a first end thereof to each of the two parallel second supports, each telescoping end tube being movable between extended and retracted positions, each telescoping end tube being selectively locked in the extended position by one of the plurality of locking devices connected to each of the two parallel second supports, the second U-shaped portion is pivotally connected to the exterior of the barbecue body, and each of the two parallel first supports is pivotally connected to one of the two parallel second supports; and
   c) two wheels, one of the two wheels is connected to a second end of each telescoping end tube.

2. The barbecue grill according to claim 1, further comprising a storage notch, the adjustment leg includes a storage rod, the storage rod is inserted into the storage notch when the folding leg assembly is in the folded position.

3. The barbecue grill according to claim 2, wherein the storage notch is integrally formed with the bracket.

4. The barbecue grill according to claim 2, wherein the storage rod is located between the two parallel first supports of the adjustment leg.

5. The barbecue grill according to claim 1, wherein the first U-shaped portion has a length that is shorter than a length of the second U-shaped portion.

6. The barbecue grill according to claim 1, wherein each of the plurality of locking devices includes a button connected to a resilient member, one button being inserted through a hole in each telescoping foot and each telescoping end tube on the extended position.

7. The barbecue grill according to claim 1, wherein the first U-shaped portion includes a latching ring removably inserted into one of the plurality of adjustment hooks.

* * * * *